US010248396B1

(12) United States Patent
Wiggins et al.

(10) Patent No.: US 10,248,396 B1
(45) Date of Patent: Apr. 2, 2019

(54) CODE REVIEW WITH AUTOMATED TRANSLATION

(71) Applicant: Amazon Technologies, Inc., Seattle, WA (US)

(72) Inventors: Kelly Duggar Wiggins, Seattle, WA (US); David Armour, Seattle, WA (US); Jeremy Boynes, Mercer Island, WA (US); William Cary Hall, Seattle, WA (US); Christopher A. Heilman, Pittsburgh, PA (US); Robert E. Hicks, Seattle, WA (US); William Joseph Kaper, Pittsburgh, PA (US); Addison Page Phillips, San Jose, CA (US); Thibault Pierre Seillier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 29 days.

(21) Appl. No.: 15/707,790

(22) Filed: Sep. 18, 2017

(51) Int. Cl.
  *G06F 9/44* (2018.01)
  *G06F 8/51* (2018.01)
  *G06F 8/72* (2018.01)

(52) U.S. Cl.
  CPC . *G06F 8/51* (2013.01); *G06F 8/72* (2013.01)

(58) Field of Classification Search
  None
  See application file for complete search history.

(56) References Cited

U.S. PATENT DOCUMENTS

| 8,392,872 | B2 * | 3/2013 | Bak | G06F 9/454 717/100 |
| 2004/0268311 | A1 * | 12/2004 | Pizzoli | G06F 9/454 717/124 |
| 2005/0050526 | A1 * | 3/2005 | Dahne-Steuber | G06F 9/454 717/136 |
| 2006/0116864 | A1 * | 6/2006 | McHugh et al. | G06F 9/454 717/101 |
| 2006/0130026 | A1 * | 6/2006 | McHugh | G06F 17/212 717/141 |
| 2006/0130031 | A1 * | 6/2006 | McHugh | G06F 17/212 717/162 |
| 2006/0156278 | A1 * | 7/2006 | Reager | G06F 9/454 717/104 |
| 2007/0006039 | A1 * | 1/2007 | Fichter | G06F 11/3688 714/38.14 |

(Continued)

*Primary Examiner* — Insun Kang
(74) *Attorney, Agent, or Firm* — Lee & Hayes, P.C.

(57) ABSTRACT

A system for conducting a code review of program source code including translation of content in the program source code may include a source control system. The system may also include a resource file translator to facilitate translation of the content from a first language into second languages. Upon receipt of a code review request, the source control system may notify a workflow manager that the resource files contain the content for translation, and the workflow manager may notify a resource file translator that the program source code contains the content for translation. The resource file translator may cause translation of the resource files into translated resource files. The source control system may receive program source code under review from a code reviewer interface, and the resource file translator may update the program source code under review with the translated resource files.

20 Claims, 7 Drawing Sheets

(56) References Cited

U.S. PATENT DOCUMENTS

| | | | |
|---|---|---|---|
| 2008/0066057 A1* | 3/2008 | Aoyama | G06F 11/3684 717/124 |
| 2008/0195377 A1* | 8/2008 | Kato | G06F 17/2836 704/8 |
| 2009/0083709 A1* | 3/2009 | Millett | G06F 8/35 717/120 |
| 2009/0222787 A1* | 9/2009 | Aldahleh | G06F 9/454 717/101 |
| 2010/0082523 A1* | 4/2010 | Lim | G06F 9/44505 706/60 |
| 2011/0264440 A1* | 10/2011 | Zhou | G06F 17/2288 704/8 |
| 2013/0227522 A1* | 8/2013 | Lerum | G06F 9/454 717/120 |
| 2013/0290075 A1* | 10/2013 | Kathooria | G06Q 10/06395 705/7.41 |
| 2014/0258979 A1* | 9/2014 | Zhang | G06F 8/70 717/120 |
| 2014/0280704 A1* | 9/2014 | Ongg | H04L 67/10 709/217 |
| 2014/0372098 A1* | 12/2014 | Arseniev | G06F 9/454 704/2 |

\* cited by examiner

CODE REVIEW WITH AUTOMATED TRANSLATION

BACKGROUND

It is often desirable for the text strings output by computer programs to be available in a number of different human-readable languages. For example, the same computer program might be released in a number of countries where different human-readable languages are utilized. In these scenarios, the text strings are expressed in one human-readable language (e.g., English) and then translated into multiple other human-readable languages (e.g., Spanish and German).

Translating text strings in the manner described above can, however, present a number of problems. For example, the translations might be inadvertently omitted from the program source code. In addition, even when not omitted, it can be difficult and time consuming to identify the text strings in the source code that are to be translated, which sometimes results in some text strings not being translated. As a result, non-translated text strings can be presented to end users of the program.

Even when text strings are translated, it can be necessary to synchronize the translations with the original source code following translation, which may be tedious, time consuming, and prone to error. Further, this process may be extremely inefficient, particularly when developing programs and applications that execute in service-oriented architecture environments. As a result, computing resources, such as processor cycles, memory, and mass storage, may be used inefficiently. This may also result in the inefficient use of other types of resources, such as power.

This disclosure is presented with respect to these and other considerations.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

The following detailed description is directed to technologies for providing human language translations for resource files including content in a first human language (which might be referred to herein as a "language") in computer programs during development and debugging of the source code for the computer programs. Using the disclosed technologies, software developers may specify that resource files including content in a first human language present in the source code will be translated into one or more second human languages in parallel with a code review process. The content in the first language may include, for example, one or more of text content, image content, audio content, of video content.

The resource files including content in a first language are thereafter identified and translated into the one or more second human languages by machine and/or human translators, and the one or more corresponding translations are stored in translated resource files, which are used to update the source code in parallel with changes to the source code made during the code review process. As a result, the translations are incorporated into the source code before the source code is packaged and deployed as a program or application. Consequently, the software development lifecycle, including the incorporation of one or more human language translations, may be completed more efficiently, thereby resulting in savings in the utilization of various types of computing resources, such as, for example, processor cycles, memory usage, and mass storage usage. Additionally, savings in power consumption may also be realized as a result of the more efficient use of computing resources during application development. The disclosed technologies can also provide additional technical benefits not specifically identified herein.

This disclosure is generally directed to a system for developing program source code, including subjecting the source code to a code review process and providing one or more machine or human language translations of resource files including content in a first language in the source code. The system may include a source control system configured to be in communication with a code developer interface and a code reviewer interface.

The code developer interface may be configured to facilitate submission of a request for code review of the program source code used by the program. The program source code may contain resource files including content in a first human language (e.g., the English language). The code reviewer interface may be configured to facilitate review of the program source code, for example, by one or more code reviewers.

The source control system may be configured to manage changes to the program source code resulting from the development and code review process. The source control system may also be in communication with a resource file translator configured to facilitate translation of the content from the first language into one or more second languages (e.g., the French and/or German language(s)).

The system may also include a workflow manager in communication with the source control system and the resource file translator. The workflow manager may be configured to control interaction between the source control system and the resource file translator. Responsive to receipt of the code review request, the workflow manager may be configured to notify the resource file translator that the program source code contains the content for translation from the first language to the one or more second languages.

The resource file translator may be configured to cause translation of the resource files into translated resource files containing respective ones of the one or more second language translations of the content. The source control system may be configured to receive reviewed program source code from the code reviewer interface, and the resource file translator may be configured to update the program source code under review with the translations.

The system may further include a build module in communication with the source control system. The build module may be configured to build a final program based at least in part on the updated reviewed program source code. The final program may be communicated via a network to one or more users, which may include any party that may use the program.

In some examples, when a developer writes program source code and submits it for code review, resource files including the translatable content are automatically translated in parallel with the code review. In some examples, the translated resource files appear as a code review revision. This may improve the likelihood, or ensure, that the content in the program source code is translated according to the developers' language preferences. In addition, because the translation occurs in parallel with the code review, the time for translation and code review may be reduced. Further, manual synchronization of the translations with the program source code may be eliminated, thereby reducing the development time and reducing errors associated with improper synchronization. Some or all of these potential benefits may result in increasing the efficiency of the development process, which may result in savings in the utilization of various types of computing resources, such as, for example, processor cycles, memory usage, and mass storage usage. Additionally, savings in power consumption may also be realized as a result of the more efficient use of computing resources during development.

In some examples, the workflow manager may be configured to prevent building of the final program source code until the reviewed program source code has been updated with the translated resource files. For example, the developer may configure the workflow manager to facilitate generation of translated resource files including translations of the content, and prevent building of a final program source code until the translated resource files have been generated and used to update the program source code. This may prevent the final program source code from being unintentionally built and deployed without the desired translations.

In some examples, the resource file translator may be configured to identify resource files in the program source code submitted for code review that contain the content in the first language for translation to one or more second languages. The system may further include a translation management system in communication with the resource file translator. The translation management system may be configured to receive the resource files that contain the content in the first language, and translate the content into one or more second languages, for example, as specified by the developer via the workflow manager.

In some examples, the translation management system may be configured to translate the content in the first language via a machine translator and/or one or more translator user interfaces (e.g., for use by one or more human translators). For example, the resource file translator may communicate resource files including the content for translation to the translation management system, and the translation management system may initially generate one or more translated resource files that include one or more machine translations of the text strings. The translated resource files including the machine translations may be provided to the source control system for updating the program source code. The translation management system may alternatively, or in addition, generate additional translated resource files that include human translations of the text strings, for example, to improve the quality of the translations (e.g., such that the translations are more accurate and/or easier to understand). The translated resource files including the human translations may be provided to the source control system for updating the program source code.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the embodiments described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
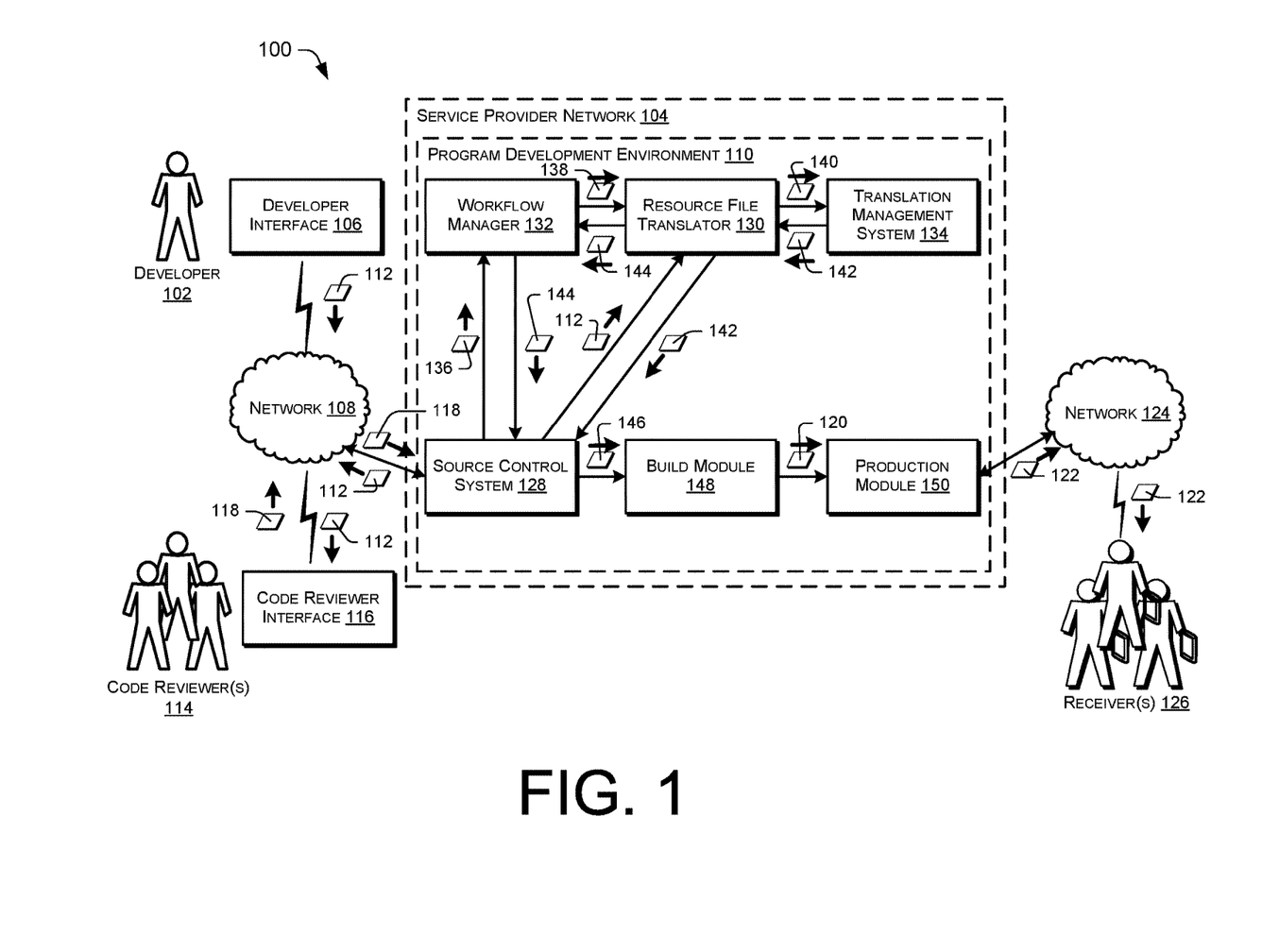
FIG. 1 is a system architecture diagram showing aspects of the configuration and operation of an example service provider network including an example program development environment for conducting a code review of source code including translation of resource files including content in a first language.

FIG. 1 is a system architecture diagram showing example aspects of a configuration and operation of a system 100 for developing program source code, including subjecting the source code to a code review process and providing one or more human language translations of resource files including content in a first language in the source code. As shown in FIG. 1, a software developer 102 may access a service provider network 104 via a developer interface 106 and a network 108. In the example shown, the service provider network 104 includes a program development environment 110 for facilitating creation of source code for a software program. As explained in more detail herein, the example program development environment 110 shown in FIG. 1 facilitates code review of the source code as well as parallel translation of resource files including content for translation contained in the source code being developed.

For example, the developer 102 may create source code 112 for a program and submit the source code 112 for code review by one or more code reviewers 114 by communicating the source code 112 to the program development environment 110 via the network 108 and the service provider network 104. The one or more code reviewers 114 may access the program development environment 110 via a code reviewer interface 116 and a network (e.g., the network 108), and retrieve the source code 112 for review. The one or more code reviewers 114 may review the source code 112, creating revisions and changes to the source code 112, and communicate the reviewed source code 118 back to the program development environment 110, for example, as explained herein.

Once code review of the source code 112 has been completed, including updating the reviewed source code 118 with one or more translations of the resource files including content for translation, for example, as explained herein, the final source code 120 may be packaged as the final version of the program 122 and deployed via a network 124 (e.g., which may be the same or a different physical network or logical network as the network 108) to one or more receivers 126 of the program 122, which may include web sites, servers, computing devices, and/or individual users of the program 122. In some examples, the program development environment 110 may be an environment that allows a developer 102 to create, compile, execute, and test software programs, such as the program 122.

In some examples, the program 122 is an application that is designed to execute within or in conjunction with a service provider network 104. For example, a development host may connect to a service provider network 104 through an appropriate network, such as the Internet. The service provider network 104 may be a distributed network through which customers and/or other users (e.g., the developer 102) may utilize computing resources, which might be referred to herein as "resources" or a "resource," such as virtual machine (VM) instances, data storage resources, and/or other types of computing resources, on a permanent or as-needed basis.

Each type or configuration of a computing resource may be available from the service provider network 104 in different sizes. For example, the service provider network 104 may offer physical hosts, VM instances or other types of data processing resources that are available for purchase and that have many different configurations of processor capabilities, main memory, disk storage, and operating system. The service provider network 104 may also offer other types of computing resources for purchase and use by users.

For example, the service provider network 104 may offer virtual or hardware devices, database resources and instances, file or block data storage resources, and/or networking resources, such as load balancing resources, domain name service (DNS) resources, virtual private cloud (VPC) resources, virtual local area network (VLAN) resources, and/or other types of hardware and software computing resources or network services on a permanent or as-needed basis. The computing resources may also include, but are not limited to, VM instances and images, security groups, option groups, gateways, option sets, network access control lists (ACLs), subnets, storage buckets, network interfaces, snapshots, spot market requests, and storage volumes.

The computing resources described above may be provided in one particular implementation by one or more data centers operated by a service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks (WANs), such as the Internet. Additional details regarding the configuration of a data center for implementing aspects of the functionality disclosed herein will be provided below with regard to FIGS. 5-7.

The computing resources described briefly above may also be provisioned and de-provisioned as needed in a manual or automated fashion. For example, the service provider network 104 may be configured to instantiate a new instance of a computing resource, such as a VM instance, in response to a request or in response to an increase in demand for a network service or other condition. Other types of computing resources may also be provisioned and de-provisioned in a similar manner. Network services in the service provider network 104 may also provide functionality for automatically scaling and/or de-scaling resources based upon demand for the computing resources and/or other factors.

As discussed briefly above, the service provider network 104 may also be configured to provide various types of network services for use internally and by customers. For example, and without limitation, the service provider network 104 may provide an on-demand computing service for providing VM instances on-demand, a data storage service for storing data, a cryptography service, a database service, a notification service, an authentication service, a policy management service, and, potentially, other types of network-accessible services. These and other services and their associated computing resources may be utilized together to implement various types of network-based applications in the service provider network 104. Additional details regarding implementations of the service provider network 104 will be discussed below with regard to FIGS. 5-7.

As also discussed briefly above, software developers 102 may commonly perform many iterations on code changes to source code prior to deploying the changes to a production environment, such as within service provider network 104. For example, a developer 102 might iteratively create a change to the source code 112 of a program, build the program in the program development environment 110, perform tests on the program, deploy the program to a test environment (e.g., in the service provider network 104), and perform tests on the program in the test environment.

The iterative process described above may be extremely time consuming and inefficient, particularly when developing programs that execute in service-oriented architecture environments, such as the service provider network 104. As a result, computing resources, such as processor cycles, memory, and mass storage, may be used inefficiently. This might also result in the inefficient use of other types of resources, such as power. The technologies disclosed herein may address these, and potentially other, considerations.

In order to address the considerations set forth above, and potentially others, as shown in FIG. 1, the system 100 for developing program source code, including subjecting the source code to a code review process and providing one or more human language translations of resource files including content for translation in the source code, is provided. As shown in FIG. 1, the system 100 may include a source control system 128 in communication with the developer interface 106 and the code reviewer interface 116. The developer interface 106 may be configured to facilitate submission of a request for code review of the source code 112 used by the program being developed. The source code 112 may contain one or more resource files including content for translation in a first language. The code reviewer interface 116 may be configured to facilitate review of the program source code 112, for example, by one or more code reviewers 114. The source control system 128 may be configured to manage changes to the program source code 112 resulting from the code review process.

As shown in FIG. 1, the source control system 128 may also be in communication with a resource file translator 130 configured to facilitate translation of the content from the first language into one or more second languages. The system 100 may also include a workflow manager 132 in communication with the source control system 128 and the resource file translator 130. The workflow manager 132 may be configured to control interaction between the source control system 128 and the resource file translator 130, for example, as discussed herein.

In some examples, the source control system 130 may be utilized by the developer 102 to manage changes made to the source code 112 and other components of the program. For example, the developer 102 may utilize functionality provided by the source control system 128 to manage changes made to source code files and other types of files associated with a program under development.

The source control system 128, in some examples, may store the source code files and other files in a data store, commonly referred to as a "source code repository." Such a repository may be utilized to store a version control graph that describes changes that have been made to the program over time. The source code repository may also be utilized to store other types of data and/or metadata relating to the creation and modification of the source code of a program.

In some examples, the workflow manager 132 may facilitate tailoring of the program development environment 110 to create a developer-specific development workflow for developing the source code 112. For example, the developer-specific development workflow may include an instance of a software development workflow, which may be referred to herein as a "personal workflow instance" or a "workflow instance," which may also be tailored to a specific developer 102.

Steps of a development workflow may include, for example, building and testing a program or application prior to deployment, provisioning resources (e.g., computing resources) for use by the program in the service provider network 104, deploying the program or application and changes to the program or application, starting execution of the program, performing unit and integration tests (or other types of tests) on the program prior to or after deployment de-provisioning resources (e.g., the computing resources) for use by the program in the service provider network 104, and initiating the code review for the changes to the application or program to be initiated. Other steps may be defined. Additionally, the order in which the steps are performed may also be specified by the developer 102.

In some examples, a developer 102 may add a translation configuration file to the source code 112 for translation of resource files including content in a first language in the source code 112 to one or more second languages. The workflow manager 132 may enable a translation rule upon receipt of the code request and source code 112. Thereafter, as explained herein, the resource file translator 130 may leverage a translation management system 134 and generate translated resource files containing one or more respective second language translations of the resource files including the content in the source code 112, which may be used to update the source code 112, as explained in more detail herein.

In some examples, the resource file translator 130 is a computing system that provides functionality for the creation, modification, and/or management of digital content, and which may support multiple users working in a collaborative environment, such as the program development environment 110. As will be described in greater detail herein, the resource file translator 130 provides functionality for allowing the developer 102 to specify content dimensions for content items managed by the resource file translator 130. In some examples, the content items may be source code and/or text strings expressed in a human readable language or other types of content for translation, such as, for example, image content, audio content, and video content.

The content dimensions associated with the content items may include metadata utilized to determine how to translate a content item for a particular type of use or locale. For example, the content dimensions may be used as context at translation time that will inform the translation process and affect the translation of the content item. In some examples, the content dimensions may be specified by the developer 102 using the JavaScript Object Notation (JSON) language, the Extensible Markup Language (XML), or another language suitable for defining metadata that is associated with the content items.

For example, a content dimension may be specified for a particular content item that specifies that the content item will be utilized in a particular geographic location. As another example, a content dimension may be specified for a particular content item that specifies that the content item is to be utilized on a particular type of computing platform, such as, for example, a mobile computing platform or a desktop computing platform.

In some examples, a content dimension may be specified for a particular content item specifying that the content item is expressed in a particular style, such as, for example, in a formal or informal tone. The content items may have multiple content dimensions, such as "mobile computing platform" and "informal tone," for example. Other examples of content dimensions may include, for example, content dimensions that define a quality of a translation of a content item or a pluralization of the translation of the content item. In some examples, the developer may be able to specify certain configurations related to the translations. For example, the syntax of the resource files, the syntax of the content for translation, the number of second languages into which the content is to be translated, and/or whether a human reviewer must approve the translations. Other types of configurations may be specified.

As shown in FIG. 1, the resource file translator 130 may also provide the developer 102 and/or the code reviewers 114 with the ability to specify content dimensions for a particular content item, for example, via the developer interface 106 and code reviewer interface 116, respectively. In the example shown in FIG. 1, for example, the developer 102 may utilize the developer interface 106 to specify the content dimensions for the content item. Other users of the resource file translator 130 may also specify content dimensions for the content item using the code reviewer interface 116. The resource file translator 130 may store the content dimensions in association with the content item in an appropriate data store. Although a single resource file translator 130 is shown in FIG. 1, multiple resource file translators may be utilized, for example, in other configurations.

As shown in FIG. 1, the resource file translator 130 may be in communication with the translation management system 134. In some examples, the translation management system 134 may be a computing system that provides functionality for managing translations of human readable text. For example, the translation management system 134 may provide functionality including automating the translation process, facilitating communication between translators, and receiving content items, such as content for translation contained in the source code 112 from the resource file translator 130 and assigning the content items to translators for translation. In some examples, the translation management system 134 may include one or more aspects of translation processes, such as, for example, those described in U.S. patent application Ser. No. 15/278,788, filed Sep. 28, 2016, and U.S. patent application Ser. No. 15/279,025, filed Sep. 28, 2016, the disclosures of both of which are incorporated herein by reference.

The translation management system 134 may, in some examples, provide functionality for performing machine translations of the content items. For example, the translation management system 134 may utilize a machine translation pipeline, which includes machine translation systems, for example, machine translation systems that leverage machine learning technologies to improve the machine translations. Other machine translation technologies may be utilized in other configurations. In some examples, the translation management system 134 may integrate with external systems for performing machine translations of the content items.

As shown in FIG. 1, the resource file translator 130 may provide translation requests to the translation management system 134 to translate content items, such as text strings from the source code 112. The translation request may include or reference the content item to be translated. In some examples, the translation request may include the content dimensions associated with the content item, and the translation request may include other information such as, for example, information identifying the source and target languages for the content item and/or other metadata associated with the content item.

In some examples, the translation management system 134 may receive the translation request and manage or perform the translation of the content item from a first human readable language to one or more second or target human readable languages. Translation of the content item may be performed by a human translator, by machine translation, by a combination (e.g., a machine translation followed by post-editing by human translators), and may, in some examples, leverage linguistic technologies, such as terminology databases and translation memory, for example, such as those described above.

In some examples, the translation management system 134 may leverage the content dimensions associated with the content item throughout the machine or human language translation process. For example, the content dimensions may be used as context, which will inform the translation of the content item, allowing the human or machine translators to provide a higher quality translation of the content item. In addition, the human or machine translator may provide translations for content dimensions that do not exist in the source content item.

For example, the content item might include the text "Go," and the content dimensions associated with the content item might specify a platform (e.g., "desktop") and a language (e.g., English). Because "Go" is a short string and is therefore suitable for display on a small screen, such as that of a mobile computing device, no English, mobile device-specific version of the string will be created. Both desktop and mobile devices will see "Go" when the content item is viewed in English.

During translation of the content item into German, however, a human translator will see the source text "Go" and be prompted to translate into the content dimensions for "desktop" and "mobile." In response, the human translator may create the German-language translation of "Fertigstellen" for the content dimensions of German and desktop, and "Los" for the content dimensions of German and mobile. In this manner, content owners may utilize the content dimensions to localize their content items more effectively with fewer iterations between translators, engineers, and user experience designers.

In some examples, upon receipt of a code review request from the developer 102, the source control system 128 may be configured to send a notification 136 to the workflow manager 132 that the source code 112 includes content for translation from a first language to one or more second languages specified by the developer 102. The workflow manager 132 sends a notification 138 to the resource file translator 130 that the program source code 112 contains the content for translation from the first language to the one or more second languages. In some examples, the resource file translator 130 may be configured to determine whether the content in the resource files for translation is syntactically incorrect in a manner that prevents translation. If the resource file translator 130 determines the content is syntactically incorrect, in some examples, the resource file translator 130 may automatically return the code review request to the developer 102 for correction of the syntax and resubmission of the code review request.

The resource file translator 130 may be configured to identify resource files 140 from the source code 112 that include content for translation and send them to the translation management system 134 for translation from the first language to the one or more second languages. The translation management system 134 may be configured to generate one or more translated resource files 142 containing the one or more second language translations using, for example, machine and/or human translators, for example, as described herein. In some examples, the translation management system 134 may be configured to facilitate return of the code review request to the developer 102, for example, in the event that the content for translation is not in a translatable form. For example, the content may not be properly internationalized (or placed in a form that is translatable), and the translation management system 134 may enable a human translator (or a machine translation system) to send a message back to the developer 102 indicating that the content is not translatable, for example, because it is not properly internationalized, and requesting that the content be corrected and resubmitted for code review and translation.

The translation management system 134 sends the translated resource files 142 to the resource file translator 130, and the resource file translator 130 updates the code review with the translated resource files 142, sending the translated resource files 142 to the source control system 128, which incorporates the translated resource files 142 into the code review. The resource file translator 130 sends a notification 144 to the workflow manager 132 that the translation is complete. In some examples, the notification 144 is sent to the source control system 128. In some examples, once the source control system 128 receives the translated resource files 142, the source control system 128 may facilitate review of the translated resource files 142 by the code reviewers 114, and, in some examples, facilitate rejection of the translated resource files 142 by the code reviewers 114. In such examples, the code reviewers 114 may reject the translated resource files 142 and send them back to the resource file translator 130, so the resource file translator 130 can send them to the translation management system 134 for correction, for example, by a human translator.

Concurrently, or in parallel, the code reviewers 114, using the code reviewer interface 116, conduct the code review of the source code 112. Once the code review is complete and approved, the reviewed source code 118 is sent back to the source control system 128, for example, via the network 108. In some examples, the source control system 128 sends the updated reviewed source code 146 (i.e., the reviewed source code 118, which has been updated with the translated resource files 142 including the second language translations of the content for translation), to a build module 148 configured to build the final source code 120 and program 122 based on the reviewed source code 118 and the translated resource files 142.

In some examples, the system 100 may include a production module 150, for example, that produces the software (e.g., in an automated manner) that includes that code-reviewed and translated source code. Thereafter, the software including the program 122 is released, for example, via the network 124 to the receiver(s) 126, which may include, for example, websites, servers, computing devices, and/or individual users of the program 122. Users of the program 122 may use the program 122 in their preferred language according to the second languages specified by the developer 102.

Figure 2:
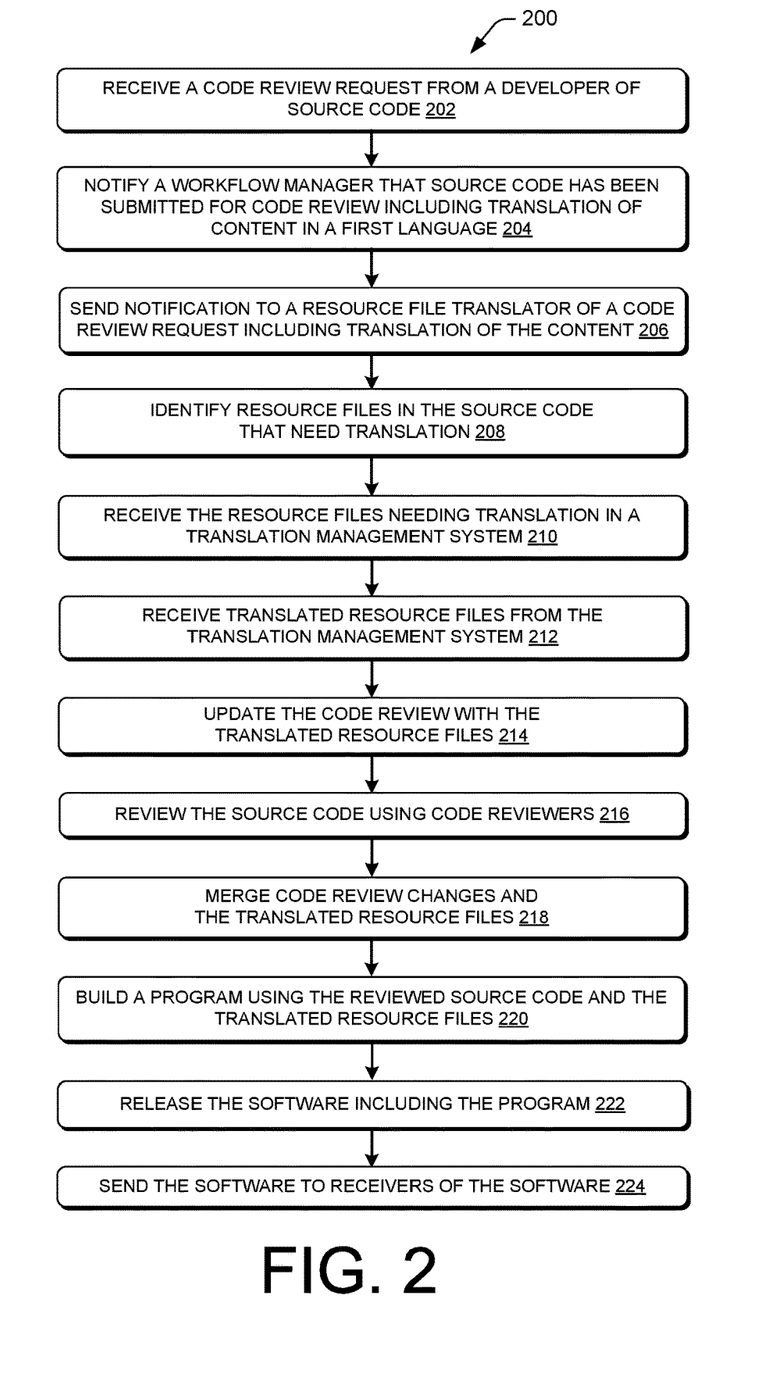
FIG. 2 is a flow diagram showing an example routine that illustrates aspects of the operation of an example program development environment for conducting a code review of source code including translation of resource files including content in a first language.
Figure 3:
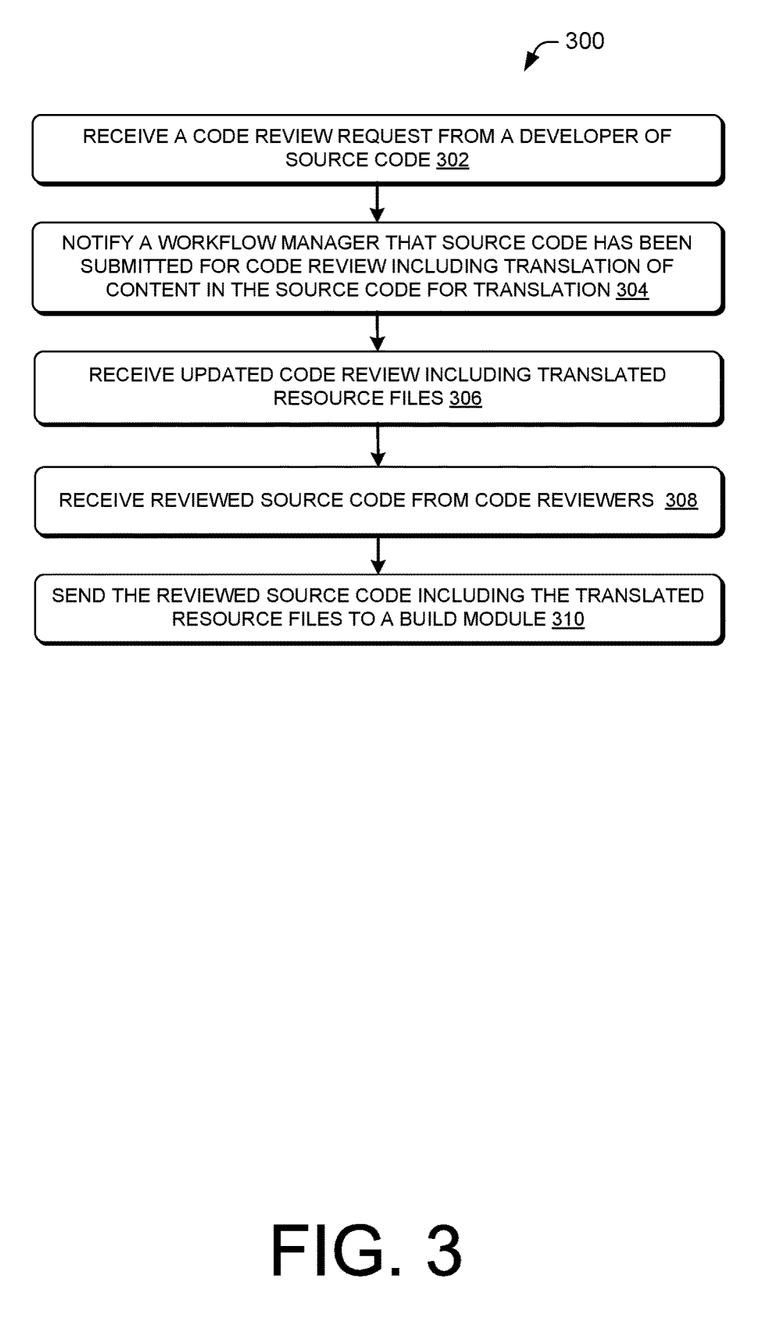
FIG. 3 is a flow diagram showing, from the perspective of an example source control system, a routine that illustrates aspects of the operation of an example program development environment for conducting a code review of source code including translation of resource files including content in a first language.
Figure 4:
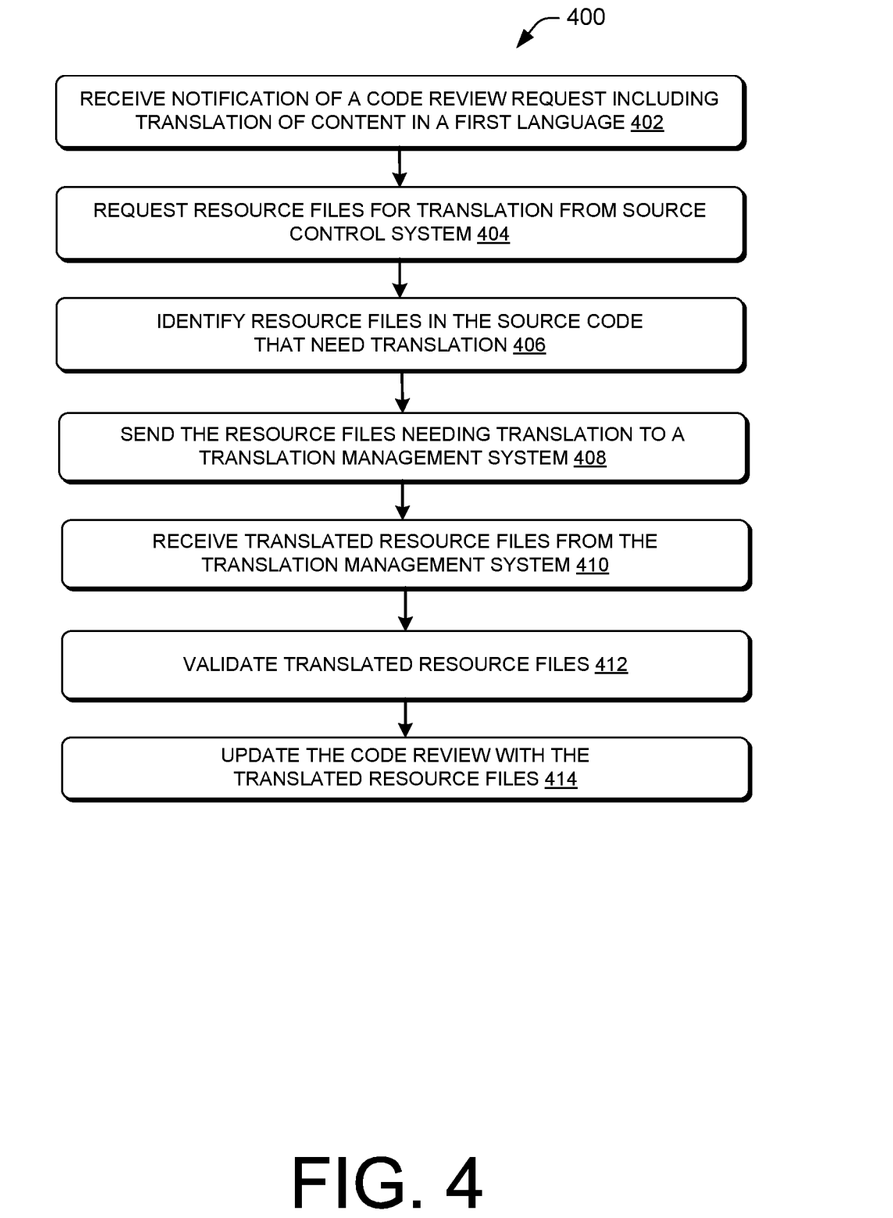
FIG. 4 is a flow diagram showing, from the perspective of an example resource file translator, a routine that illustrates aspects of the operation of an example program development environment for conducting a code review of source code including translation of resource files including content in a first language.

FIGS. 2-4 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more non-transitory computer-readable storage media that, when executed by one or more processors, perform the recited operations.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 2 is a flow diagram of an illustrative process 200 for conducting a code review of source code created by a software developer, which includes code review conducted in parallel with translation of the content for translation in a first human language (e.g., the English language) included in the source code into one or more second human languages (e.g., the French and/or German language(s)), for example, as specified by the developer. The process 200 may be implemented in the service provider network 104 described above with respect to FIG. 1 and/or in other environments and architectures.

At 202, the example process 200 may include receipt by a source control system of a code review request from the developer of the source code. For example, the developer of source code including one or more resource files including content for translation may submit a code review request to a program development environment of a service provider network. The code review request may specify translation of the content (e.g., one or more text strings) from a first language to one or more second languages. In some examples, this may include sending the source code to a staging area in the source control system.

The process 200, at 204, may include notifying a workflow manager that the source code has been submitted for code review and that the code review includes translation of the resource files including content for translation included in the source code.

At 206, the process 200 may include sending a notification to a resource file translator notifying the resource file translator that the source code includes one or more resource files including content for translation. In some examples, the workflow manager may send the notification. In some examples, the notification may take the form of a notification provided by a notification service executing in the service provider network. Other forms of notification are contemplated.

The process 200, at 208, may include identifying the resource files in the source code that need translation. For example, the resource file translator may identify resource files included in the source code that include text strings that need to be translated. In some examples, the resource file translator receives the source code and/or the resource files including the content for translation from the source control system, for example, from the staging area.

At 210, the process 200 may include receiving the resource files including the content for translation in a translation management system. For example, the resource file translator may send the resource files for translation to the translation management system, and the translation management system may use machine and/or human translators to translate the content for translation from the first language into one or more second languages.

The process 200, at 212, may include receipt of one or more translated resource files that include the one or more translations from the translation management system. For example, the resource file translator may receive the translated resource files.

At 214, the process 200 may include updating the code review with the translated resource files. In some examples, the resource file translator may update the code review with the translated resource files. In some examples, the resource file translator may review the code review, for example, to ensure that any resource files including content for translation in the source code have been translated according to, for example, the developer specifications, and/or to ensure that the translations are either accurate or not deficient in some respect.

If the translated resource files are properly translated, the resource file translator may approve the code review with respect to the translation aspect. Alternatively, if the resource file translator determines that the translations are not complete and/or are inaccurate or deficient, the resource file translator may send the code review request back to the developer, so that the developer can resubmit the code review request to restart the code review process. This may prevent the code review from being completed without proper translation of the text strings included in the source code, thus preventing the program from being built and distributed without the proper translations.

The process 200, at 216, may include review of the source code by one or more code reviewers. As mentioned herein, this may occur in parallel (i.e., concurrently) with the translation of the resource files including content for translation in the source code. Thus, the process 200 may result in the code review and translation process being shorter in duration than other code review processes for which any translations of the content are part of a separate process that occurs in series rather than in parallel with the code review.

In some examples, if the code reviewers approve the code review, the process 200 may continue to the next operation. However, if the code reviewers do not approve the code review, the code reviewers may send the code review request back to the developer, so that the developer can resubmit the code review request to restart the code review process. In some examples, if the translated resource files are improper, inaccurate, or contain a problem, the code reviewers may send the translated resource files to the resource file translator, which in turn, may send the translated resource files to the translation management system, so that the error or problem with translated resource files may be corrected, for example, by a human translator.

At 218, once the code review, including the translated resource files, has been completed and the requisite approvals have been made, the process 200 may include merging the code review changes and the translated resource files. For example, the source control system may combine the source code changes from the code reviewers with the translated resource files that include the translated content.

The process 200, at 220, may include building the program using the reviewed source code and the translated resource files (e.g., the merged code review and the translated resource files). For example, a build module may receive the reviewed source code and the translated resource files, and build the program.

At 222, the process 200 may include releasing the software including the program for production. For example, the build module may send the program to an automated production module, which produces the software including the program with the code-reviewed and translated source code.

The process 200, at 224, may include sending the software to receivers of the software, which may include, for example, web sites, servers, computing devices, and/or individual users of the program 122.

FIG. 3 is a flow diagram of an illustrative process 300, from the perspective of a source control system, for conducting a code review of source code created by a software developer, which includes code review conducted in parallel with translation of content for translation in the source code. The process 300 may be implemented in the service provider network 104 described above with respect to FIG. 1 and/or in other environments and architectures.

At 302, the example process 300 may include receipt by the source control system of a code review request from the developer of the source code. For example, the developer of source code including one or more resource files including content for translation may submit a code review request to a program development environment of a service provider network. The code request may specify translation of the one or more resource files including content for translation from a first language into one or more second languages. In some examples, this may include creating a staging area in the source control system and sending the source code to the staging area.

The process 300, at 304, may include the source control system notifying a workflow manager that the source code has been submitted for code review and that the code review includes translation of one or more resource files including content for translation included in the source code. In some examples, the workflow manager may notify the resource file translator that the code review includes content for translation. In some examples, the notification may take the form of a notification provided by a notification service executing in the service provider network. Other forms of notification are contemplated.

The process 300, at 306, may include receiving at the resource control system updated code review including translated resource files from the resource file translator.

At 308, the process 300 may include receiving at the resource control system reviewed source code from one or more code reviewers.

If the code review, including the content translations, has been approved, the process 300, at 310, may include the source control system sending the reviewed source code, including the translations, to the build module, so that the source code may be merged into a final source code, and the program may be built.

FIG. 4 is a flow diagram of an illustrative process 400, from the perspective of a resource file translator, for conducting a code review of source code created by a software developer, which includes code review conducted in parallel with translation of one or more resource files including content for translation included in the source code. The process 400 may be implemented in the service provider network 104 described above with respect to FIG. 1 and/or in other environments and architectures.

At 402, the example process 400 may include receiving at the resource file translator a notification that the source code includes one or more resource files including content for translation. The notification may be received from the source control system and/or the workflow manager.

At 404, the process 400 may include requesting resource files for translation from the source control system. For example, the resource file translator, upon receipt of notification that the source code includes the content for translation, the resource file translator may request the resource files from the source control system.

The process 400, at 406, may include identifying by the resource file translator the resource files in the source code that need translation. For example, the resource file translator may identify resource files included in the source code that include content for translation. In some examples, the resource file translator receives the source code and/or the resource files including text strings from the source control system, for example, from the staging area.

At 408, the process 400 may include sending by the resource file translator resource files including the content for translation to the translation management system. For example, the resource file translator may send the resource files for translation to the translation management system, and the translation management system may use machine and/or human translators to translate the content from the first language to one or more second languages.

The process 400, at 410, may include receipt by the resource file translator of one or more translated resource files that include the one or more translations from the translation management system.

At 412, the process 400 may include validating (and/or normalizing) the translated resource files. For example, the resource file translator may be configured to automatically validate the spelling and/or grammar of the translations received from the translation management system. In some examples, this validation may be provided as an option to the developer.

At 414, the process 400 may include updating by the resource file translator the code review with the translated resource files. In some examples, the resource file translator may review the code review, for example, to ensure that any resource files including content for translation in the source code have been translated according to, for example, the developer specifications, and/or to ensure that the translations are either accurate or not deficient in some respect.

If the translated resource files are properly translated, the resource file translator may approve the code review with respect to the translation aspects. Alternatively, if the resource file translator determines that the translations are not complete and/or are inaccurate or deficient, the resource file translator may send the code review request back to the developer, so that the developer can resubmit the code review request to restart the code review process.

Figure 5:
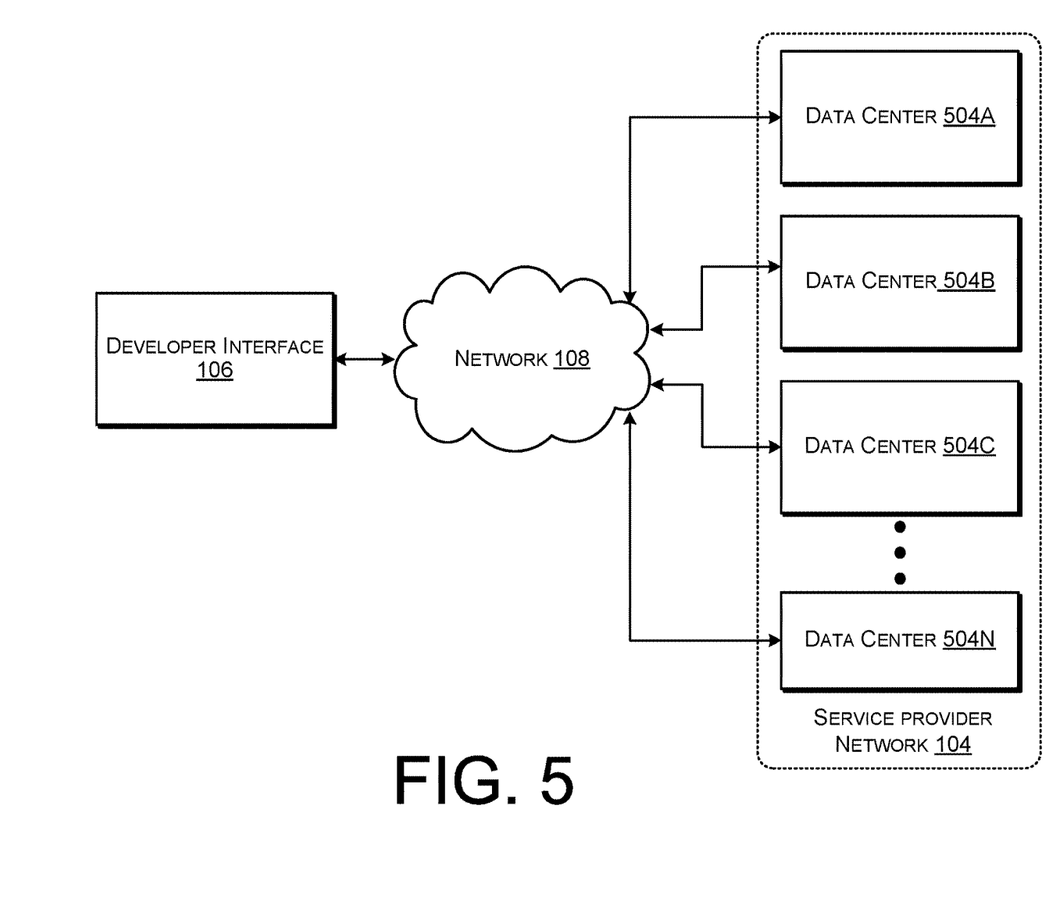
FIG. 5 is a computing system diagram that illustrates a configuration for a service provider network that can be utilized to implement aspects of the technologies disclosed herein.

FIG. 5 is a system and network diagram that shows aspects of a service provider network 104 that may provide computing resources for implementing aspects of the various technologies disclosed herein including the computing resources described herein. The computing resources provided by the service provider network 104 may include various types of computing resources, such as data processing resources, data storage resources, networking resources, data communication resources, network services, and the like.

Each type of computing resource provided by the service provider network 104 can be general-purpose or can be available in a number of specific configurations. For example, data processing resources may be available as physical computers or virtual machine instances in a number of different configurations. The virtual machine instances may be configured to execute applications, including web servers, application servers, media servers, database servers, some or all of the services described herein, and/or other types of programs. Data storage resources may include file storage devices, block storage devices, and the like. The service provider network 104 may also be configured to provide other types of resources and network services.

The computing resources provided by the service provider network 104 may be enabled in some implementations by one or more data centers 504A-504N, which might be referred herein singularly as "a data center 504" or in the plural as "the data centers 504." The data centers 504 may include facilities utilized to house and operate computer systems and associated components. The data centers 504 may typically include redundant and backup power, communications, cooling, and security systems. The data centers 504 may also be located in geographically disparate locations. One illustrative configuration for a data center 504 that implements aspects of some of the technologies disclosed herein will be described below with regard to FIG. 6.

Users of the service provider network 104, such as a user of the developer interface 106, can access the various resources provided by the service provider network 104 over a network 108, which may be a wide area communication network (WAN), such as the Internet, an intranet or an Internet service provider (ISP) network or a combination of such networks. For example, a developer interface 106 may be utilized to access the service provider network 104 by way of the network 108. As discussed above, a system for developing program source code 112 may also be implemented utilizing a VM provided by the service provider network 104 in some examples. It should be appreciated that a local-area network (LAN), the Internet, or any other networking topology known in the art that connects the data centers 504 to remote computers may also be utilized. It should be appreciated that combinations of such networks can also be utilized.

Figure 6:
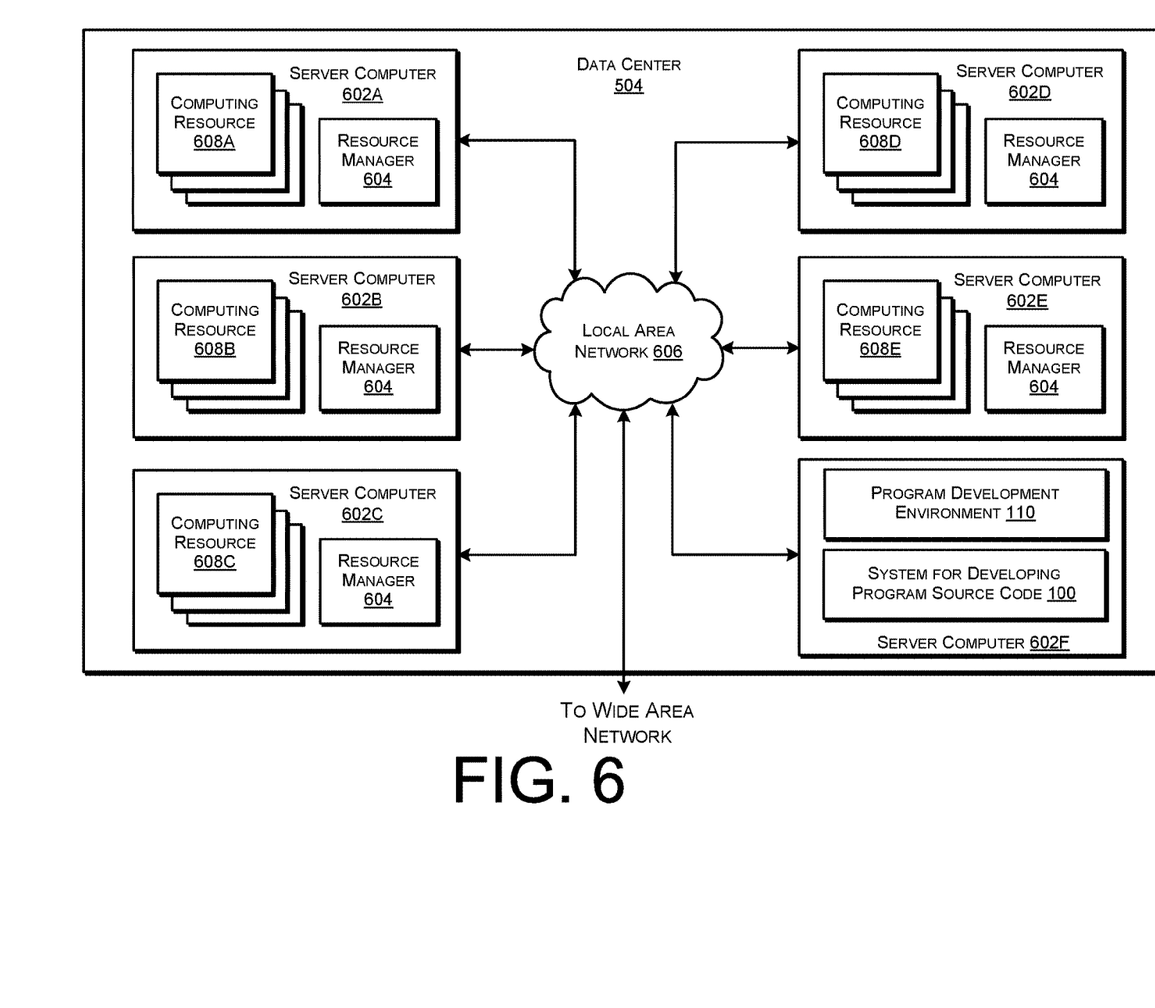
FIG. 6 is a computing system diagram that illustrates aspects of the configuration for a data center that can be utilized to implement aspects of the technologies disclosed herein.

FIG. 6 is a computing system diagram that illustrates an example configuration for a data center 504 that may be utilized to implement aspects of the technologies disclosed herein. The example data center 504 shown in FIG. 6 includes several server computers 602A-602F, which might be referred to herein singularly as "a server computer 602" or in the plural as "the server computers 602," for providing computing resources 608A-608E, which may include, for example, the computing resources described above.

The server computers 602 may be standard tower, rack-mount, or blade server computers configured appropriately for providing the computing resources 608. As mentioned above, the computing resources 608 may be data processing resources, such as virtual machine instances or hardware computing systems, data storage resources, database resources, networking resources, and others. Some of the server computers 602 may also be configured to execute a resource manager 604 capable of instantiating and/or managing the computing resources 608. In the case of VM instances, for example, the resource manager 604 may be a hypervisor or another type of program configured to enable the execution of multiple virtual machine instances on a single server 602.

The data center 504 shown in FIG. 6 may also include a server computer 602F that can execute some or all of the software components described above. For example, the server computer 602F may be configured to execute software components for implementing the development host program development environment 110 as a VM, for providing computing resources for use by a personal application stack instance executing on a personal application stack instance, and the related functionality described herein. The server computer 602F may also be configured to execute other components and/or to store data for providing some or all of the functionality described herein. In this regard, it should be appreciated that the software components illustrated in FIG. 6 as executing on the server computer 602F may execute on many other physical or virtual servers in the data centers 604 in various embodiments.

In the example data center 504 shown in FIG. 6, an appropriate LAN 606 is also utilized to interconnect the server computers 602A-602F. The LAN 606 is also connected to the network 108 illustrated in FIG. 5. It should be appreciated that the configuration and network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components may also be utilized for balancing a load between each of the data centers 504A-504N, between each of the server computers 602A-602F in each data center 504 and, potentially, between computing resources 608 in each of the data centers 504. It should also be appreciated that the configuration of the data center 504 described with reference to FIG. 6 is merely illustrative and that other implementations may be utilized.

Figure 7:
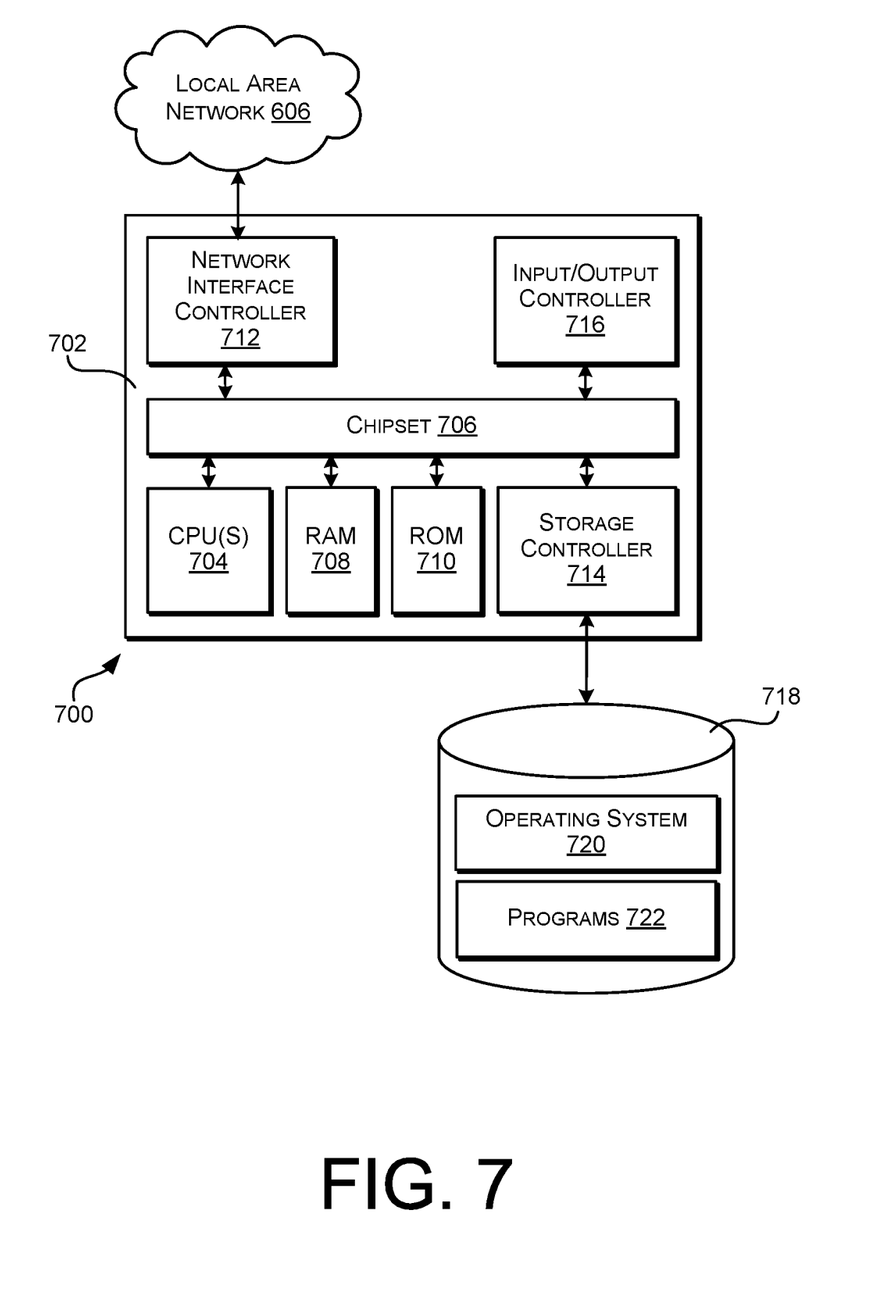
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing various aspects of the functionality described herein. The computer architecture shown in FIG. 7 illustrates a conventional server computer, workstation, desktop computer, laptop, tablet, network appliance, e-reader, smartphone, or other computing device, and may be utilized to execute any of the software components presented herein. For example, the computer architecture shown in FIG. 7 may be utilized to execute software components for providing a development host program development environment 110 in the service provider network 104, for providing the computing resources, and for providing the related functionality described herein. The computer architecture shown in FIG. 7 may also be utilized to implement a program development environment 110 in hardware (e.g., a laptop or desktop computer configured in the manner described above).

The example computer 700 shown in FIG. 7 includes a baseboard 702, or "motherboard," which is a printed circuit board to which a multitude of components or devices may be connected by way of a system bus or other electrical communication paths. In some examples, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the examples described herein.

The computer 700 may operate in a networked environment using logical connections to remote computing devices and computer systems through a network, such as the network 706. The chipset 706 may include functionality for providing network connectivity through an NIC 712, such as a gigabit Ethernet adapter. The NIC 712 may be capable of connecting the computer 700 to other computing devices over the network 606. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store an operating system 720, programs 722, and data, which have been described in greater detail herein. The mass storage device 718 may be connected to the computer 700 through a storage controller 714 connected to the chipset 706. The mass storage device 718 may include one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the mass storage device 718 by transforming the physical state of the physical storage units to reflect the information being stored. The specific transformation of physical state can depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 may store an operating system 720 utilized to control the operation of the computer 700. In one embodiment, the operating system 720 is the LINUX operating system. In another embodiment, the operating system 720 is the WINDOWS SERVER operating system from MICROSOFT CORPORATION. In other embodiments, the UNIX operating system or one of its variants can be utilized as the operating system 720. It should be appreciated that other operating systems can also be utilized. The mass storage device 718 can store other system or application programs and data utilized by the computer 700.

In some examples, the mass storage device 718 or other computer-readable storage media is encoded with computer-executable instructions which, when loaded into the computer 700 and executed, transform the computer from a general-purpose computing system into a special-purpose computer capable of implementing the embodiments described herein. These computer-executable instructions transform the computer 700 by specifying how the CPUs 704 transition between states, as described above. According to some examples, the computer 700 has access to computer-readable storage media storing computer-executable instructions which, when executed by the computer 700, perform the various processes described herein. The computer 700 may also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

It should be appreciated that technologies for providing a program development environment have been disclosed herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example embodiments and applications illustrated and described, and without departing from the true spirit and scope of the present invention, which is set forth in the following claims.

What is claimed is:

1. A system comprising:
  one or more server computers comprising:
    a source control system configured to be in communication with a developer interface and a code reviewer interface, the developer interface being configured to submit a request for code review of program source code and the code reviewer interface being configured to review the program source code, the program source code containing resource files containing content in a first language, and the source control system being configured to manage changes to the program source code resulting from the code review;
    a resource file translator configured to translate the resource files from the first language into one or more second languages; and
    a workflow manager in communication with the source control system and the resource file translator, the workflow manager being configured to control interaction between the source control system and the resource file translator,
  wherein:
    responsive to receipt of the code review request, the source control system is configured to notify the workflow manager that the resource files contain the content for translation from the first language into the one or more second languages;
    the workflow manager is configured to notify the resource file translator that the resource files contain the content for translation from the first language to the one or more second languages;
    the resource file translator is configured to identify resource files in the program source code that contain the content for translation from the first language to the one or more second languages;
    the resource file translator is configured to cause translation of the resource files into translated resource files containing respective ones of the one or more second language translations of the content;
    the source control system is configured to receive reviewed program source code from the code reviewer interface; and
    the resource file translator is configured to update the program source code under review with the translated resource files.

2. The system of claim 1, further comprising a build module in communication with the source control system and configured to build a program based at least in part on the updated reviewed program source code.

3. The system of claim 2, wherein the workflow manager is configured to prevent building of the program until the reviewed program source code has been updated with the translated resource files.

4. The system of claim 1, wherein the resource files containing the content for translation from the first language into the one or more second languages comprise resource files that are one or more of text content, image content, audio content, video content, or combinations thereof.

5. The system of claim 1, further comprising a translation management system in communication with the resource file translator and configured to:
  receive the resource files that contain the content for translation from the first language into the one or more second languages; and
  translate the content into one or more second languages.

6. The system of claim 5, wherein the translation management system is configured to translate the content via at least one of machine translation or a translator user interface.

7. The system of claim 5, wherein updating the program source code based at least in part on the translated resource files comprises receiving the translated resource files at the resource file translator from the translation management system and updating the program source code based at least in part on the translated resource files.

8. At least one non-transitory computer-readable storage medium to store instructions which, in response to being performed by one or more processors, cause an apparatus to:
  receive a request for code review of program source code comprising a program resource file containing content in a first language;
  in response to the request, initiate translation of the content from the first language into one or more second languages;
  create one or more translated resource files containing respective ones of the one or more second language translations of the content;
  initiate a code review of the program source code to create a reviewed program source code;

update the program source code under review with the one or more translated resource files;
merge the reviewed program source code and the translated resource files to create merged program resource files; and
build a program based at least in part on the merged program resource files.

9. The non-transitory computer-readable storage medium of claim 8, having further instructions stored thereon to at least one of validate or normalize the translated resource files.

10. The non-transitory computer-readable storage medium of claim 9, having further instructions stored thereon to deploy the program via a network to one or more servers in a service provider network.

11. The non-transitory computer-readable storage medium of claim 8, wherein creating the one or more translated resource files comprises creating one or more initial translated resource files containing respective ones of the one or more second language translations of the content, and wherein updating the program source code under review comprises updating the program source code under review with the one or more initial translated resource files.

12. The non-transitory computer-readable storage medium of claim 11, wherein the one or more initial translated resource files contain machine translations of the content.

13. The non-transitory computer-readable storage medium of claim 11, wherein creating the one or more translated resource files comprises creating one or more final translated resource files containing respective ones of the one or more second language translations of the content, and wherein updating the program source code under review comprises updating the program source code under review with the one or more final translated resource files.

14. The non-transitory computer-readable storage medium of claim 13, wherein the one or more final translated resource files contain one or more second language translations that are improved relative to the one or more second language translations contained in the initial translated resource files.

15. A computer-implemented method comprising:
receiving a request for code review of a program source code comprising a program resource file containing content in a first language;
in response to the request, initiating translation of the content in the first language from the first language into one or more second languages;
creating one or more translated resource files containing respective ones of the one or more second language translations of the content;
initiating a code review of the program source code to create a reviewed program source code;
updating the program source code under review with the one or more translated resource files;
merging the reviewed program source code and the one or more translated resource files to create merged program resource files; and
building a program based at least in part on the merged program resource files.

16. The computer-implemented method of claim 15, further comprising at least one of validating or normalizing the translated resource files.

17. The computer-implemented method of claim 16, further comprising deploying the program via a network to one or more servers in a service provider network.

18. The computer-implemented method of claim 15, wherein creating the one or more translated resource files comprises creating one or more initial translated resource files containing respective ones of the one or more second language translations of the content, and wherein updating the program source code under review comprises updating the program source code under review with the one or more initial translated resource files.

19. The computer-implemented method of claim 18, wherein creating the one or more initial translated resource files comprises providing machine translations of the content.

20. The computer-implemented method of claim 18, wherein creating the one or more translated resource files further comprises:
creating one or more final translated resource files containing respective ones of the one or more second language translations of the content, and
wherein updating the program source code under review comprises updating the program source code under review with the one or more final translated resource files, and
wherein the one or more final translated resource files contain one or more second language translations that are improved relative to the one or more second language translations contained in the initial translated resource files.

* * * * *